United States Patent [19]

Jomes et al.

[11] Patent Number: 4,611,014
[45] Date of Patent: Sep. 9, 1986

[54] POROUS POLYMERS

[75] Inventors: Keith Jomes; Barry R. Lothian; Alexander Martin; Graham Taylor; Zia Haq, all of Merseyside, England

[73] Assignee: Lever Brothers Company, New York, N.Y.

[21] Appl. No.: 707,306

[22] Filed: Mar. 1, 1985

[30] Foreign Application Priority Data

Mar. 5, 1984 [GB] United Kingdom ............... 8405680

[51] Int. Cl.$^4$ ..................... C08F 14/00; C08F 114/00
[52] U.S. Cl. ..................................... 521/146; 521/64; 521/147; 521/149; 521/150
[58] Field of Search ................. 521/64, 147, 149, 150

[56] References Cited

U.S. PATENT DOCUMENTS

| Re. 27,444 | 7/1972 | Will . | |
|---|---|---|---|
| 3,255,127 | 6/1966 | von Bonin et al. . | |
| 3,256,219 | 6/1966 | Will . | |
| 3,734,867 | 5/1973 | Will . | |
| 3,763,056 | 10/1973 | Will . | |
| 3,988,508 | 10/1976 | Lissant . | |
| 4,039,489 | 8/1977 | Fletcher et al. . | |
| 4,522,953 | 6/1985 | Barby et al. | 521/64 |
| 4,536,521 | 8/1985 | Haq | 521/64 |

FOREIGN PATENT DOCUMENTS

| 60138 | 9/1982 | European Pat. Off. . |
|---|---|---|
| 1078055 | 1/1968 | United Kingdom . |
| 1458203 | 12/1976 | United Kingdom . |
| 1116800 | 9/1977 | United Kingdom . |
| 1483587 | 9/1977 | United Kingdom . |
| 1576228 | 9/1980 | United Kingdom . |
| 2000150 | 4/1982 | United Kingdom . |

*Primary Examiner*—Morton Foelak
*Attorney, Agent, or Firm*—Milton L. Honig; James J. Farrell

[57] ABSTRACT

This invention discloses highly porous crosslinked functionalized polymers having interconnected cavities and a pore volume greater than 5.6 cc/g in the swollen state and having a capacity to absorb aqueous or organic acidic liquids from its dried state of at least 3 g liquid per gram of polymer. The polymers are generally based on styrene and/or methacrylate compositions and contain various ionic or polar functional groups.

7 Claims, No Drawings

POROUS POLYMERS

This invention relates to porous polymeric materials; more particularly to crosslinked polymeric materials of low density and high absorbency and to methods for their production and chemical modification. In European Patent Application No. 60 138 novel crosslinked polymers have been disclosed which are of unusually low density and high porosity.

A technique for their preparation employing a novel high internal phase emulsion polymerisation system has been disclosed and various monomers have been employed in the production of these porous polymers.

In view of the interesting properties exhibited by these porous polymers further work has been done on evaluating alternative monomers in an attempt to introduce chemically active groupings into the porous polymer which, together with the polymer structure, allow the preparation of porous polymers having useful physical and chemical characteristics.

More particularly by selection of the appropriate functional groups and drying environment specialised absorbents and carriers can be produced.

The materials provided by this invention comprise a family of closely related highly porous crosslinked functionalised polymers crosslinked from 1-20% and having interconnected cavities or chambers of micron dimensions whose total pore volume is greater than 5.6 cc/gm in its solvent swollen state and having a capacity for spontaneous absorption of aqueous and/or organic acidic liquids from its dried state of at least 3 g liquid per gram of polymer and having a capacity for acid absorption (aqueous or organic) such that the ratio of aqueous and/or organic acid to neutral oil absorption (defined as methyl oleate) is greater than 1.2, said polymer comprising structural units

in which A represents a crosslinked carbon chain, Y is an optional spacer group and Z is an ionic or polar functional group, selected from amino and substituted amino groups, higher alkyl cationic nitrogen species, higher alkyl amine oxide or lower alkyl cationic nitrogen species only when its counterion is an organic species containing 8 or more carbon atoms, or a mixture of such groups.

Preferably, A represents a saturated, crosslinked carbon chain having the structure:

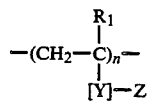

where $R_1$ is hydrogen or methyl group. Y is an optional spacer group, especially

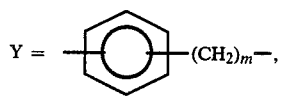

where $m=0$ to 5 (preferably $m=0$ or 1).

Z represents a single or mixture of ionic or polar functional groups of structures 1-4:

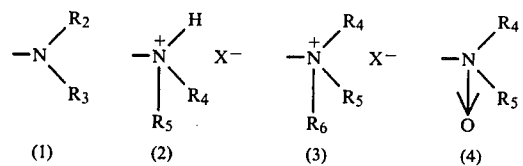

where $R_2$, and $R_3$ may be the same or different and are short chain or long chain alkyl groups or a cycloalkyl or aryl or hydroxyalkyl group or where $R_2$ and $R_3$ form part of a ring system. The groups $R_4$, $R_5$ and $R_6$ are alkyl groups as above and may again be the same or different, but where at least one group is a higher alkyl chain such that the number of carbons present in $R_4+R_5+R_6$ is 10 or more for the cationic species (3) or where $R_4+R_5$ contains 8 or more carbons for the amine salts (2) and the amine oxides (4). In such longer chain cationic species, the counterion $X^-$ can be an inorganic species such as chloride, sulphate or nitrate or it can be a long or short chain organic counterion such as acetate or oleate. Alternatively, the groups $R_4$, $R_5$ and $R_6$ may all be shorter alkyl groups such that the number of carbons present in the cationic species (3) is less than 10 and the number of carbons present in the amine salts (2) is less than 8 only when the counterion $X^-$ is an organic residue containing 8 or more carbon atoms such as oleate. In species (3) $X^-$ can also represent $OH^-$.

In a further preferred form of the invention, A represents a linear saturated crosslinked carbon chain of the type:

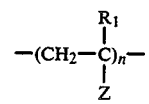

where $R_1$ is again hydrogen or methyl and Z is attached directly to the chain A. The group Z represents any of those groups described above.

Alternatively, A can represent an unsaturated crosslinked carbon chain derived from a diene monomer, or a mixture of carbon chain systems.

The level of crosslinking agent can be from 1-20% or more, preferably 2-10%. At crosslinking levels less than 1%, the polymers are soft gels in their solvent swollen state and are unable to support their own solvent swollen weight. Moreover, at crosslinking levels of 2% or less, the polymers are prone to structural collapse during the drying process unless great care is exercised in the choice of drying conditions. At crosslinking levels of 15-20% or greater, shrinkage of the polymer during drying and re-swelling during solvent absorption is eliminated because the polymer chains are immobilised by the crosslinking agent. However, at these higher crosslinking levels, the polymers will still comply with our definition of acid absorption ($>3$ g/g) and acid/methyl oleate absorption ratio $>1.2$, especially at the higher levels of functionalisation. Optimal polymer absorption occurs at crosslinking levels between 2 and 10% as a compromise between mechanical strength and polymer mobility and swelling.

Pore volume should be greater than 85% (5.6 cc/g) of polymer volume and preferably greater than 95% (20 cc/g) as the liquid absorption capacity increases with pore volume. Again liquid absorption capacity is dependent on the pore volume coupled with the levels of crosslinking and degree of substitution. At lower pore volumes, the crosslinking levels are preferably in the lower range (2–10%) and the level of substitution in the higher range (preferably >70%) for maximum liquid absorption.

The degree of substitution or functionalisation of the polymer is >30%, preferably >50% and most preferably >70%, since the amount of solvent imbibed increases with number of ionic or polar functional groups present, provided the level of crosslinking does not exceed 15–20%. Above this level of crosslinking, the amount of liquid absorbed becomes much less sensitive to the degree of substitution since the liquid uptake is then dependent on the mobility of the solvated polymer chains.

At higher degrees of substitution (usually >50%) and lower levels of crosslinking (>15%), these polar or cationic polymers generally show some slight to moderate shrinkage when dried from polar solvents but retain a fairly open expanded, brittle structure compared with the highly collapsed granular polymers of our co-pending application (our case T.3005). Many of the polymers show a marked visible swelling of the polymer structure during acid absorption, particularly at higher degrees of substitution and lower crosslinking levels, although this swelling is not an essential feature of the invention. The polymers described are hydrophobic and generally float on water and aqueous electrolyte at neutral and alkaline pH. All such polymers show a much greater capacity to absorb aqueous and/or organic acids compared with their ability to absorb neutral oils as defined by methyl oleate.

The absorbent materials provided by this invention are generally prepared indirectly by chemical modification of a preformed porous polymer block carrying a reactive group such as a chlorine or a chloromethyl functionality. The preformed porous polymers which are suitable for subsequent chemical modification can be prepared by polymerisation of suitable monomers of low water solubility, such as chloromethylstyrene or vinyl chloride or their mixtures with suitable comonomers. Other monomers (including the crosslinking agent) can be incorporated at levels up to 20% or more provided that such monomers do not destabilise the high internal phase emulsion used in the polymer preparation and provided that the reactive monomer is present at a sufficiently high level that the final polymer generated after chemical modification carries ionic or polar functional groups on a minimum of 30% of the monomer residues.

Other suitable monomers which can be used to prepare the highly porous polymer for subsequent chemical modification are styrene or α-methylstyrene or other substituted styrene or vinyl aromatic monomer which, after polymerisation, can be chloromethylated or otherwise functionalised to produce a porous polymer intermediate which can be subsequently converted to the amino or cationic porous polymers of this invention.

The chloromethyl styrene polymer is prepared by the general procedure described in European Patent Application No. 60 138.

The method of preparation of the crosslinked chloromethyl styrene polymer is similar to that of styrene-based porous polymer, although a slightly higher concentration of emulsifier is required to give a uniform structure (25% for chloromethyl styrene cf 20% for styrene).

Lower levels of emulsifier give materials which contain some large voids (ca 100 μm) in addition to the typical pore structure (ca 10 μm). With higher levels of surfactant the preparation of the emulsion becomes more difficult and 25% emulsifier is the maximum level which can be incorporated into a 96.5% internal phase emulsion with ease.

2.5 Span 80 and 1 cm$^3$ commercial divinyl benzene/ethyl vinyl benzene are dissolved in 10 cm$^3$ chloromethyl styrene in a polypropylene beaker. 0.75 gm potassium persulphate is dissolved in 300 cm$^3$ demineralised water and this solution is added dropwise to the stirred monomer/surfactant mixture. After the addition of the potassium persulphate solution is complete the beaker is sealed and heated to 60° C. in a water bath to effect polymerisation. After 18 hours a solid block of wet polymer is obtained which may be dried in air at 30° to 40° C.

In the Examples, the starting substrate was a porous polymer prepared by the process as described. The polymer was dried and soxhlet extracted with hexane prior to any chemical transformations, to remove the residual emulsifier (Span 80), but this is not essential in most of the chemical modification reactions. Extraction of the emulsifier was carried out partly to reduce the possibility of unwanted side reactions and partly to facilitate interpretation of Infra Red Spectra which were used qualitatively to monitor extents of reaction.

Alternatively, the porous polymers carrying amino or cationic groups can be prepared directly by emulsification and polymerisation of the appropriate monomer of low water solubility, provided that such monomers can be formed into a stable and polymerisable high internal phase emulsion.

In the preparation of the cationic species, soxhlet extraction of the Span 80 prevents ion exchange taking place which results in the formation of ammonium carboxylate salts.

In the following Examples details are given of the preparation of porous polymers according to this invention and also of comparable polymers not within the scope of the invention to emphasise the beneficial properties of the polymers provided by this invention. Temperatures are °C.

PREPARATION OF THE AMINE DERIVATIVES

The amines were generally prepared by refluxing preformed chloromethylstyrene porous polymer with the desired secondary amine in a suitable solvent (eg water, ethanol, dimethylformamide [DMF]) for periods up to 30 hours. The precise reaction conditions depend on (a) the solubility of the amine in the solvent employed, (b) the reactivity of the amine and (c) the desired degree of reaction. The solids were then isolated, washed and dried.

| Example | Preparation of Examples Shown in Table 1 Preparation |
| --- | --- |
| 1 | Excess aqueous amine, 100°, 14 hours on chloromethyl polymer |
| 2 | Excess aqueous amine, 100°, 4.5 hours on chloromethyl polymer |
| 3 | Excess aqueous amine, 100°, 20 hours on chloromethyl polymer |
| 4 | Excess aqueous amine, 100°, 30 hours on chloromethyl polymer |
| 5,12 | Excess ethanolic amine, steam bath, 11 hours on chloromethyl polymer |
| 6 | Excess ethanolic amine, steam bath, 10 hours on chloromethyl polymer |
| 7 | Reduction of nitrostyrene derivative with excess stannous chloride/ HCl in ethanol, 3 days at RT plus 3 days at 100° C. |
| 8 | Standard porous polymer preparation |
| Polystyrene polymer | |
| 9–11 | Excess aqueous amine, steam bath, 11 hours on chloromethyl polymer |
| 13 | Excess aqueous amine, 90°, 5 minutes on chloromethyl polymer |

However, amino derivatives can be prepared by various other routes, such as the reduction of the corresponding nitrostyrene to the p-aminostyrene derivative (Table 1, Example 7).

Examples of amino polymers are given in Table 1. Examples 1–6 illustrate the effect of alkyl chain length and polarity of the acid absorption properties where it can be seen that the more polar amines have a greater affinity for aqueous acid than for organic acids, while the longer alkyl chain amines have a greater affinity for organic acids than for aqueous acids. Intermediate chain length amines have an affinity for both organic and aqueous acids. Example 7 shows a primary amine having a greater affinity for aqueous acid than for neutral oil while Example 8 shows that the materials disclosed in European Patent Application No. 60 138 do not satisfy the criteria of this invention. Examples 9 and 4 show the effect of pore volume and Examples 10–12 and 4 show the effect of crosslinking level. Examples 13 and 3 show the effect of substitution level.

PREPARATION OF AMINE SALTS

The amine salts are prepared by treating the appropriate amine with either neat or dilute solutions of mineral or organic acids. Thus, for example, the long chain amines can be treated with methanolic solutions of hydrochloric acid or the shorter chain amines can be treated with neat organic carboxylic acids such as oleic acid. The salts so formed are then washed with solvent until free of excess acid and dried.

Examples are given in Table 2. Examples 3, 4, and 10 show the effect of alkyl chain length on liquid uptake where, at short chain lengths (Example 10), the salts do not satisfy our absorption criteria while, at longer chain lengths, the amine salts do have a higher affinity for either aqueous acid (Example 4) or organic acid (Example 3) relative to their absorption of neutral oils. Examples 7 and 3 show mainly the effect of crosslinking level although this is compounded to some extent by differences in substitution levels. In contrast to our co-pending application (our case T.3005), changing the polarity of the drying solvent does not radically alter the absorption characteristics of the porous polymers. Thus, long chain amine salts still satisfy our absorption criteria (Table 2(B), Example 3), while short chain species still fail to satisfy th specified absorption characteristics (Examples 15 and 16). Examples 13 and 16 show the effect of the counterion $X^-$, where only short chain amine salts with long chain organic counterions (Example 13) show the required acid absorbancy.

PREPARATION OF THE QUATERNARY NITROGEN SPECIES

The preformed chloromethylstyrene porous polymer was filled under vacuum with an ethanolic solution of the appropriate lon chain tertiary amine (usually 10 times molar excess). The reactants were heated at temperatures between 40° C. and reflux for periods between 3 minutes and 15 hours depending on (a) the reactivity of the amine and (b) the desired extent of reaction. Reaction will take place at lower temperatures but the reaction times are increased. The long chain cationic products are then removed from the reaction mixtures, washed extensively with ethanol and then methanol to remove unreacted amine and allowed to air dry. The solids could be further dried in a vacuum oven at elevated temperatures (80° C.), if desired. The extents of reaction were quantified using a standard Volhard's estimation for chloride ions.

Examples are given in Table 2. Examples 1, 2 and 9 show the effect of alkyl chain length or total number of carbons surrounding the nitrogen. Short alkyl chain derivatives (Example 9) do not satisfy our criteria, whereas the longer alkyl chain derivatives ($>C_{10}$) show a marked affinity for organic acids relative to neutral oils. Drying such materials from non-polar solvents such as hexane, does not change their absorption characteristics (Table 2(B)) where the long chain derivatives still satisfy our criteria (Example 2) and the short chain derivatives till lie outside the field of this invention (Example 14). This contrasts with the behaviour of the short chain quaternary nitrogen species described in our co-pending patent application (our case T.3005).

PREPARATION OF THE AMIDE OXIDES

The amine oxide derivatives were prepared by immersing the long chain amino porous polymers in 30% hydrogen peroxide solution, using vacuum filling to asist the process. The reactants were then heated at 60° C. for periods up to 15 hours. The solids were recovered, washed and dried.

Examples are given in Table 2. Examples 5, 6 and 11 show the effect of alkyl chain length where only the long chain materials (Examples 5 and 6) satisfy our absorption criteria. Examples 6 and 8 show mainly the effect of crosslinking level although this is again compounded by the levels of substitution. Again, changing the polarity of the drying solvent from methanol (polar) to hexane (non-polar) does not radically alter the absorption characteristics of the polymers, the long chain derivatives (Example 5, Table 2(B)) still satisfy our criteria which the short chain derivatives (Example 17) fail.

| Preparation of Examples Shown in Table 2 | |
|---|---|
| Example | Preparation |
| 1 | Excess ethanolic amine, 100°, 10.5 hours on chloromethyl polymer |
| 2 | Excess ethanolic amine, 100°, 7 hours on chloromethyl polymer |
| 3,4,7,10 | Methanolic HCl on the appropriate amine polymer |
| 5,6,8,11 | Excess 30% aqueous $H_2O_2$ on the appropriate amine polymer, 60°, 7 hours |
| 9 | Excess ethanolic amine, 100°, 7.5 hours on chloromethyl polymer |
| 12 | Standard porous polymer preparation |
| Polystyrene polymer | |
| 13 | 100% oleic acid on appropriate amine polymer |
| 14 | Excess aqueous amine, reflux, 30 min on chloromethyl polymer |
| 15,16 | Methanolic HCl on appropriate amine polymer |
| 17 | Excess 30% aqueous $H_2O_2$, 60°, 7 hours on the amine polymer |

TABLE 1

Polymers of the type:

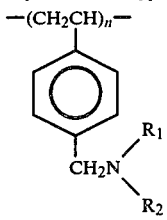

All polymers dried from methanol

| | | | | Liquid Absorption (g liquid/gm polymer) | | | 50% $H_2SO_4$ | Oleic Acid |
|---|---|---|---|---|---|---|---|---|
| Example | Polymer | Crosslinking Level (%) | Pore Volume (cc/g) | Level of Substitution (%) | 50% $H_2SO_4$ | Oleic Acid | Methyl-oleate | Me. Oleate Ratio | Me. Oleate Ratio |
| 1 | $R_1 = R_2 = CH_2CH_2OH$ | 5 | 30 | ** | 64.1 | <1 | <1 | >64 | — |
| 2 | $R_1 + R_2 =$ morpholine | 5 | 30 | 85.7 | 70.5 | 3.8 | 1.3 | 54.3 | 2.9 |
| 3 | $R_1 = R_2 = CH_3$ | 5 | 30 | 85 | 128.6 | 88.0 | 8.5 | 15.1 | 10.3 |
| 4 | $R_1 = R_2 = C_2H_5$ | 5 | 30 | 90 | 113.0 | 106.7 | 9.0 | 12.6 | 11.8 |
| 5 | $R_1 = R_2 = n\text{-}C_4H_9$ | 5 | 30 | 74 | 59.8 | 43.4 | 1.7 | 35.2 | 26.1 |
| 6 | $R_1 = R_2 = n\text{-}C_6H_{13}$ | 5 | 30 | 83 | 6.2 | 35.3 | 3.9 | 1.59 | 9.05 |
| 7 | poly (p-aminostyrene) | 5 | 30 | ** | 37.8 | 24.8 | 25.7 | 1.47 | 0.96 |
| 8 | unsubstituted polystyrene | 5 | 30 | 0 | 0* | 26.0 | 22.4 | 0 | 1.16 |
| 9 | $R_1 = R_2 = C_2H_5$ | 5 | 9 | 83.5 | 31.6 | 30.9 | 11.0 | 2.87 | 2.81 |
| 4 | $R_1 = R_2 = C_2H_5$ | 5 | 30 | 90 | 113.0 | 106.7 | 9.0 | 12.6 | 11.8 |
| 10 | $R_1 = R_2 = C_2H_5$ | 2 | 30 | 78.5 | 26.6 | 54.2 | 1.2 | 22.2 | 45.2 |
| 4 | $R_1 = R_2 = C_2H_5$ | 5 | 30 | 90 | 113.0 | 106.7 | 9.0 | 12.6 | 11.8 |
| 11 | $R_1 = R_2 = C_2H_5$ | 10 | 30 | 73 | 58.1 | 54.3 | 25.0 | 2.32 | 2.17 |
| 12 | $R_1 = CH_3\ R_2 =$ cyclohexyl | 20 | 30 | 61 | 26.2 | 11.6 | 9.4 | 2.79 | 1.23 |
| 13 | $R_1 = R_2 = CH_3$ | 5 | 30 | 39 | 49.0 | 30.3 | 7.1 | 6.9 | 1.03 |
| 3 | $R_1 = R_2 = CH_3$ | 5 | 30 | 85 | 128.6 | 88.0 | 8.5 | 15.1 | 10.3 |

*floats on the liquid
**not determined

TABLE 2

Polymers of the type:

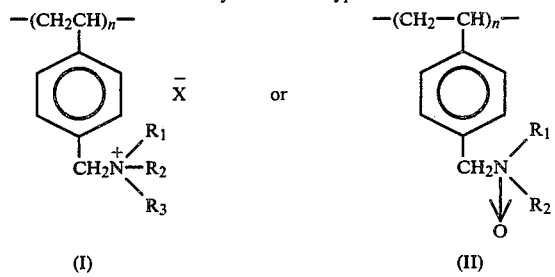

(I)      (II)

| | | | Cross-linking Level (%) | Pore Volume (cc/g) | Level of Substi-tution (%) | Liquid Absorption (g liquid/g polymer) | | | | 50% $H_2SO_4$ Me. Oleate Ratio | Oleic Acid Me. Oleate Ratio |
|---|---|---|---|---|---|---|---|---|---|---|---|
| Example | Polymer | | | | | $H_2O$ | 50% $H_2SO_4$ | Oleic Acid | Methyl-oleate | | |
| (A) All polymers dried from methanol | | | | | | | | | | | |
| 1 | I, $R_1 = CH_3$ $R_2 = R_3 = C_{12}H_{25}$ | x = Cl | 5 | 30 | 60 | 0* | 0* | 35.0 | 8.75 | 0 | 4.0 |
| 2 | I, $R_1 = R_2 = CH_3$ $R_3 = C_{10}H_{21}$ | x = Cl | 5 | 30 | 70 | 0* | 0* | 29.4 | 3.4 | 0 | 8.65 |

TABLE 2-continued

Polymers of the type:

$$-(CH_2CH)_n- \quad \text{or} \quad -(CH_2-CH)_n-$$

(with phenyl ring, $CH_2N^+R_1R_2R_3 \cdot \bar{X}$ for (I); and phenyl ring with $CH_2N(R_1)(R_2) \to O$ for (II))

| Example | Polymer | | Cross-linking Level (%) | Pore Volume (cc/g) | Level of Substitution (%) | $H_2O$ | 50% $H_2SO_4$ | Oleic Acid | Methyl-oleate | 50% $H_2SO_4$ Me. Oleate Ratio | Oleic Acid Me. Oleate Ratio |
|---|---|---|---|---|---|---|---|---|---|---|---|
| 3 | I, $R_1 = H$, $R_2 = R_3 = C_6H_{13}$ | x = Cl | 5 | 30 | 83 | 0* | 0* | 30.0 | 2.8 | 0 | 10.7 |
| 4 | I, $R_1 = H$, $R_2 = R_3 = C_4H_9$ | x = Cl | 5 | 30 | 74 | 0* | 32.6 | 5.8 | 9.6 | 3.4 | 0.6 |
| 5 | II, $R_1 = R_2 = C_6H_{13}$ | | 5 | 30 | 83 | 0* | 0* | 41.7 | 1.2 | 0 | 34.8 |
| 6 | II, $R_1 = R_2 = C_4H_9$ | | 5 | 30 | 74 | 0* | 0* | 25.5 | 1.2 | 0 | 21.3 |
| 7 | I, $R_1 = H$, $R_2 = CH_3$, $R_3$ = cyclohexyl | x = Cl | 20 | 30 | 61 | 0* | 0* | 11.8 | 6.2 | 0 | 1.9 |
| 8 | II, $R_1 = CH_3$, $R_2$ = cyclohexyl | | 20 | 30 | 61 | 0* | 0* | 9.8 | 7.7 | 0 | 1.27 |
| 9 | I, $R_1 = R_2 = CH_3$, $R_3 = C_6H_{13}$ | x = Cl | 5 | 30 | 80 | 27.2 | 0* | 1.05 | <1 | 0 | — |
| 10 | I, $R_1 = H$, $R_2 = R_3 = C_2H_5$ | x = Cl | 5 | 30 | 90 | 53.0 | ** | <1 | <1 | 0 | — |
| 11 | II, $R_1 = R_2 = C_2H_5$ | | 5 | 30 | 85 | 51.2 | ** | <1 | <1 | 0 | — |
| 12 | unsubstituted polystyrene | | 5 | 30 | 0 | 0* | 0* | 26.0 | 22.4 | 0 | 1.16 |
| (B) All polymers dried from hexane | | | | | | | | | | | |
| 2 | I, $R_1 = R_2 = CH_3$, $R_3 = C_{10}H_{21}$ | x = Cl | 5 | 30 | 70 | 0* | 0* | 37.8 | 2.6 | 0 | 14.5 |
| 3 | I, $R_1 = H$, $R_2 = R_3 = C_6H_{13}$ | x = Cl | 5 | 30 | 83 | 0* | 0* | 25.8 | 12.3 | 0 | 2.1 |
| 5 | II, $R_1 = R_2 = C_6H_{13}$ | | 5 | 30 | 83 | 0* | 0* | 29.2 | 11.6 | 0 | 2.52 |
| 13 | II, $R_1 = H$, $R_2 = R_3 = C_2H_5$ | x = oleate | 5 | 30 | 90 | 0* | 0* | 60.2 | 7.8 | 0 | 7.73 |
| 14 | I, $R_1 = R_2 = R_3 = CH_3$ | x = Cl | 5 | 30 | 85 | 27.0 | *** | 9.0 | 8.65 | *** | 1.04 |
| 15 | I, $R_1 = H$, $R_2 = R_3 = CH_3$ | x = Cl | 5 | 30 | 85 | 40.0 | *** | 12.2 | 13.5 | *** | 0.9 |
| 16 | I, $R_1 = H$, $R_2 = R_3 = C_2H_5$ | x = Cl | 5 | 30 | 90 | 0* | 0* | 13.8 | 17.2 | 0 | 0.8 |
| 17 | II, $R_1 = R_2 = CH_3$ | | 5 | 30 | 85 | 24.2 | *** | 14.2 | 13.6 | *** | 1.04 |

*Floats on the liquid
**Slow absorption with swelling in 50% $H_2SO_4$
***Not measured

We claim:
1. A highly porous crosslinked functionalised polymer crosslinked from 1-20% and having interconnected cavities or chambers of micron dimensions whose total pore volume is greater than 85% (5.6 cc/g) in its solvent swollen state and having a capacity for spontaneous absorption of aqueous and/or organic acidic liquids from its dried state of at least 3 g liquid per gram of polymer and having a capacity for acid absorption (aqueous or organic) such that the ratio of aqueous and/or organic acid to neutral oil absorption (defined as methyl oleate) is greater than 1.2, said polymer comprising structural units

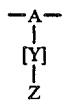

in which A represents a crosslinked carbon chain, Y is an optional spacer group and Z is an ionic or polar functional group, selected from amino and substituted amino groups, alkyl cationic quaternary nitrogen groups of 8 or more carbon atoms, alkyl amine oxide groups of 8 or more carbon atoms or alkyl cationic quaternary nitrogen groups of 8 carbons or less only when its counterion is an organic group containing 8 or more carbon atoms, or a mixture of such groups.

2. A highly porous crosslinked functionalised polymer as claimed in claim 1 in which A represents a saturated, crosslinked carbon chain having the structure:

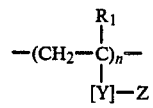

where $R_1$ is hydrogen or methyl group.

3. A polymer as claimed in claim 1 in which Z represents a single or mixture of ionic or polar functional groups of structures 1-4:

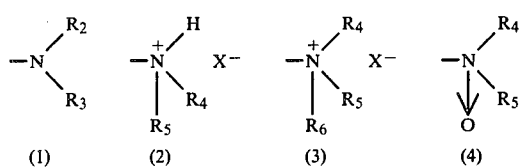

where $R_2$, and $R_3$ may be the same or different and are alkyl groups or a cycloalkyl or aryl or hydroxyalkyl group or where $R_2$ and $R_3$ form part of a ring system and where the groups $R_4$, $R_5$ and $R_6$ are alkyl groups as above and may again be the same or different, but where at least one group is an alkyl chain such that the number of carbons present in $R_4+R_5+R_6$ is 10 or more for the cationic species (3) or where $R_4+R_5$ contains 8 or more carbons for the amine salts (2) and the amine oxides (4) and where the counterion $X^-$ is an inorganic species selected from chloride, sulphate or nitrate or it can be an organic counterion or in species 3 represents $OH^-$.

4. A polymer as claimed in claim 3 in which the groups $R_4$, $R_5$ and $R_6$ are all shorter alkyl groups such that the number of carbons present in the cationic species (3) is less than 10 and the number of carbon atoms present in the amine salts (2) is less than 8 only when the counterion $X^-$ is an organic residue containing 8 or more carbon atoms.

5. A polymer as claimed in claim 1 in which the level of crosslinking agent is from 2 to 10%.

6. A polymer as claimed in claim 1 in which the pore volume of the expanded polymer is greater than 95% (20 cc/g).

7. A polymer as claimed in claim 1 in which the degree of functionalisation is greater than 50% and the level of crosslinking does not exceed 20%.

* * * * *